United States Patent [19]

Stubbs

[11] Patent Number: 5,029,959
[45] Date of Patent: Jul. 9, 1991

[54] MULTIPLE RING GUIDE FOR PAYOUT TESTING OF OPTICAL FIBERS

[75] Inventor: Scott F. Stubbs, Tucson, Ariz.

[73] Assignee: Hughes Aircraft Company, Los Angeles, Calif.

[21] Appl. No.: 426,339

[22] Filed: Oct. 24, 1989

[51] Int. Cl.⁵ .............................................. G02B 6/00
[52] U.S. Cl. .................................... 350/96.10; 57/71; 57/352; 242/18 G; 242/76; 242/125; 242/157 R; 350/96.29
[58] Field of Search ............... 350/96.10, 96.29, 96.20; 356/73.1; 57/59–75, 352–357; 43/24; 242/18 R, 18 G, 18 DD, 18 EW, 25 R, 47.09, 47.1, 76, 234, 118.1, 118.3, 125, 157 R

[56] References Cited

U.S. PATENT DOCUMENTS

| | | | |
|---|---|---|---|
| 4,174,583 | 11/1979 | Ohmura | 43/24 |
| 4,597,255 | 7/1986 | Hunter et al. | 57/62 |
| 4,749,137 | 6/1988 | Seagrave | 242/47.1 |
| 4,752,043 | 6/1988 | Heinzer | 242/18 G |
| 4,889,295 | 12/1989 | McMoore, Jr. et al. | 242/118.3 |

Primary Examiner—John D. Lee
Attorney, Agent, or Firm—R. M. Heald; C. D. Brown; W. K. Denson-Low

[57] ABSTRACT

A fiber optic canister (14) is tested by drawing an optical fiber (12) from a generally cylincrical bobbin (16) upon which is is wound, in a direction parallel to the longitudinal axis (18) of the bobbin (16). The optical fiber (12) is directed toward the drawing location (30) of the payout drive (20), and transverse vibrations in the optical fiber (12) are damped, by a guide (40) formed as a series of spaced-apart guide rings (42) having their centers aligned along a common axis (50) that is preferably coincident with the axis (18) of the bobbin (16). The guide rings (42) have central apertures (44) that decrease in diameter from the guide rings (42) nearest the canister (14) toward the payout drive (20), defining a converging locus (36) for the optical fiber (12) as it travels from the bobbin (16) to the payout drive (20).

13 Claims, 1 Drawing Sheet

MULTIPLE RING GUIDE FOR PAYOUT TESTING OF OPTICAL FIBERS

BACKGROUND OF THE INVENTION

This invention relates to the testing of optical fibers, and, more particularly, to the apparatus used to mechanically test the payout characteristics of optical fibers from bobbins.

Optical fibers are strands of glass fiber processed so that light beams transmitted therethrough are subject to total internal reflection. A large fraction of the incident intensity of light directed into the fiber is received at the other end of the fiber, even though the fiber may be hundreds of meters long. Optical fibers have shown great promise in communications applications, because a high density of information may be carried along the fiber and because the quality of the signal is less subject to external interferences of various types than are electrical signals carried on metallic wires. Moreover, the glass fibers are light in weight and made from a highly plentiful substance, silicon dioxide.

Glass fibers are typically fabricated by preparing a preform of glasses of two different optical indices of refraction, one inside the other, and processing the preform to a fiber. The optical fiber is coated with a polymer layer termed a buffer to protect the glass from scratching or other damage. As an example of the dimensions, in a typical configuration the diameter of the glass optical fiber is about 125 micrometers, and the diameter of the fiber plus the polymer buffer is about 250 micrometers (approximately 0.010 inches).

For such very fine fibers, the handling of the optical fiber to avoid damage that might reduce its light transmission properties becomes an important consideration. The fibers are typically wound onto a cylindrical or tapered bobbin with many turns adjacent to each other in a side by side fashion. After one layer is complete, another layer of fiber is laid on top of the first layer, and so on. The final assembly of the bobbin and the wound layers of fiber is termed a canister, and the mass of wound fiber is termed the fiber pack. When the optical fiber is later to be used, the fiber is payed out from the canister in a direction parallel to the axis of the bobbin.

It has been found by experience that, where the fiber is to be payed out from the canister in a rapid fashion, as for example over a hundred meters per second, the turns of optical fiber must be held in place on the canister with an adhesive. The adhesive holds each turn of fiber in place as adjacent turns and layers are initially wound onto the canister, and also as adjacent turns and layers are payed out. Without the use of an adhesive, payout of the fibers may not be uniform and regular, leading to snarls or snags of the fibers that damage them or cause them to break as they are payed out.

It is important to test the procedures for winding the optical fiber onto the bobbins, the effectiveness of the adhesive, and any environmental degradation, under realistic payout conditions. A standard test to evaluate an optical fiber canister is to draw the optical fiber from the bobbin, parallel to its longitudinal axis using a payout drive. Payout occurs at a very high linear rate that is typically over one hundred meters per second.

To prevent excessive transverse vibration of the optical fiber and ensure that its movement uniformly converges on the location where it is pulled at this high rate, there is typically provided a conical guide between the canister and the payout wheel that pulls the optical fiber from the bobbin. This guide dampens any excessive transverse vibrations of the optical fiber during the test. Without such a guide, it is virtually impossible to pay out any substantial length of optical fiber without the fiber becoming misaligned. If misalignment occurs, the optical fiber fails.

While the guide works well for relatively short lengths of optical fiber and the testing is successful, it has not been possible to test longer lengths of optical fiber using this approach. It has been found that, when the length of the optical fiber paid out exceeds about 5 kilometers, the optical fiber almost invariably breaks, even when the conical guide is used.

Consequently, it has not been possible to conduct payout tests of optical fibers from canisters in long test lengths, typically greater than about 5 kilometers. For same current applications, much longer payout test lengths, at least about 20 kilometers, are required to validate winding procedures, adhesive type and application; and any adverse effects of extended storage on the payout characteristics. Accordingly, there exists a need for a better testing approach for evaluating the payout characteristics of optical fibers from canisters. The present invention fulfills this need, and further provides related advantages.

SUMMARY OF THE INVENTION

The present invention provides a modified apparatus and procedure for testing the high-speed payout of long lengths of optical fibers from canisters. The approach avoids the problems that caused premature failures of the optical fiber utilizing the prior approach. The present technique permits indefinitely long optical fibers to be continuously payed out from the bobbin at high rates, without failure of the optical fiber. Much of the apparatus used in the prior testing technique can be retained, resulting in minimal disruption to existing testing apparatus.

The cause of optical fiber breakage when a long length of optical fiber is tested is thought to be friction or drag between the optical fiber and the conical guide. When a length of adhesive-covered optical fiber is passed rapidly through the guide, some small fraction of the adhesive on the optical fiber rubs off onto the inner surface of the guide. This adhesive builds up, and is moved along in the direction of fiber motion. Because the cross section of the guide is reduced in diameter in the direction of optical fiber travel, a concentrating effect causes the adhesive accumulation to rapidly build up near the smaller end of the guide. The build up of adhesive exerts a drag force on the optical fiber. Eventually, after about 5 kilometers of optical fiber has been payed out, the drag force becomes so large that the tensile strength of the optical fiber is exceeded, and the optical fiber breaks.

Thus, in accordance with the invention, a process for testing the payout of an adhesive-coated optical fiber from a canister comprises the steps of mounting a canister having an optical fiber wound upon a generally cylindrical bobbin with a longitudinal axis of the bobbin coincident with a payout axis; drawing the optical fiber off the bobbin, from a drawing location located along the payout axis; and guiding the optical fiber toward the drawing location at a plurality of guide locations between the canister and the drawing location, the step of guiding being conducted so that there is no buildup of adhesive at the guide locations to exert a drag force on the optical fiber.

The guiding of the optical fiber is preferably accomplished using a series of rings that cause the optical fiber to converge upon the drawing location. In accordance with this aspect of the invention, a guide for use in the payout of an optical fiber from a canister comprises a plurality of spaced-apart guide rings with their centers lying along a common axis, the guide rings having inner diameters that increase with distance along the guide.

The spaced-apart guide rings prevent the buildup of adhesive on the guide surfaces, while causing the path of the optical fiber to converge at the drawing location. Adhesive typically does deposit on the rings, but in a manner that does not cover the guiding surfaces. Adhesive cannot build up on the guide rings because of the self-cleaning action whereby the adhesive is permitted to escape from the bearing surfaces of the guide rings. The guide rings also damp out any transverse vibrations that might cause the optical fiber to move transversely and cause the drawing apparatus to malfunction. Because no buildup of adhesive occurs in a manner that creates an excessive drag force against the optical fiber, indefinitely long lengths of the optical fiber can be rapidly drawn off the bobbin at high rates, permitting the testing of any length of optical fiber stored in a canister.

Other features and advantages of the present invention will be apparent from the following more detailed description of the preferred embodiment, taken in conjunction with the accompanying drawings, which illustrate, by way of example, the principles of the invention.

DETAILED DESCRIPTION OF THE INVENTION

In accordance with the invention, test apparatus for testing the payout of an optical fiber from a canister comprises a payout drive that draws the optical fiber from the canister; and a guide disposed between the canister and the payout drive, the guide having a plurality of spaced-apart guide rings with their centers lying along a common axis, the guide rings having inner diameters that increase with distance from the payout drive.

Figure 1:
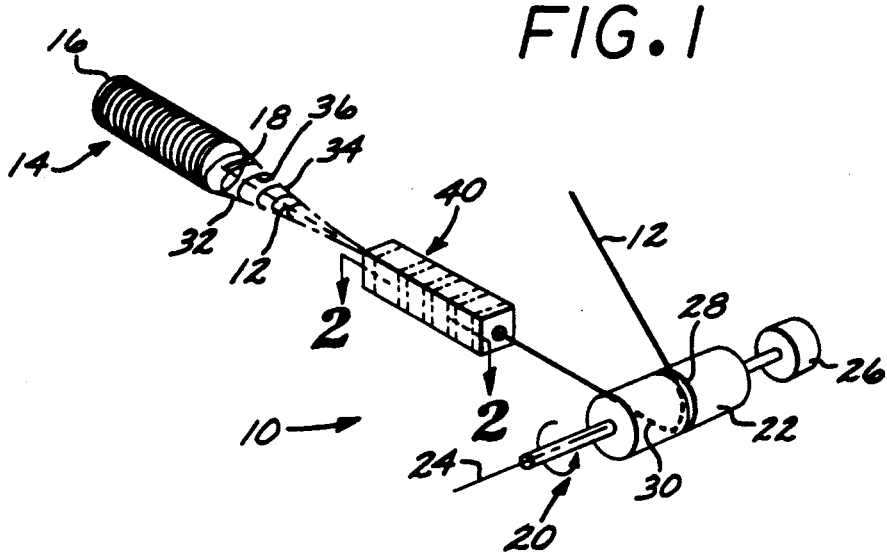
FIG. 1 is a perspective view of a payout test system.

An apparatus 10, illustrated in FIG. 1, is used to test the payout of an optical fiber 12 from a canister 14. The canister 14 consists of a plurality of turns of the optical fiber 12 on a generally cylindrical bobbin 16. As used herein, the term "generally cylindrical" means that the bobbin 16 is a cylinder or a slightly tapered conical section, but in either case has a longitudinal axis 18.

In some applications, the optical fiber 12 is payed out in a direction generally parallel to the longitudinal axis 18. The payout may be quite rapid, on the order of a hundred meters per second or more. The apparatus 10, and the present invention, are used to test optical fiber payout under such conditions.

To draw the optical fiber 12 off the bobbin 16 at such a high rate, a payout drive 20 is provided. The preferred payout drive 20 includes a wheel 22 mounted to rotate about a shaft 24 perpendicular to the longitudinal axis 18. The wheel 22 is turned by an air turbine 26 at the end of the shaft 24. The wheel 22 has a circumferential groove 28 extending around the periphery of the wheel 22. The optical fiber 12 fits into the groove, and is drawn from the bobbin 16 at a rate determined by the rate at which the wheel 22 turns. A drawing location 30 is defined as the location at which the optical fiber 12 enters the groove, and it is from this location that the drawing force to pull the optical fiber 12 from the bobbin 16 is exerted. The wheel 22 is normally positioned so that the drawing location 30 lies on or near the extension of the cylindrical axis 18 of the bobbin 16. The optical fiber 12 is not permanently fixed to the wheel 22, but is thrown off after being carried around the periphery of the wheel for some distance, typically about 150° of rotation. By way of example and not of limitation, in a typical instance the wheel has diameter of about 12 inches, and is turned at a rate of 313 turns per second by the air turbine 26, producing a linear rate of travel of the optical fiber 12 of about 300 meters per second. For a typical optical fiber having a diameter of about 0.010 inches, the groove is about 0.060–0.070 inches deep and of equal width.

As illustrated in FIG. 1, at one moment the optical fiber 12 leaves the bobbin 16 at one point on its periphery, following the path indicated at numeral 32, and shortly thereafter leaves the bobbin at another point on the periphery, following the path indicated at numeral 34. That is, the optical fiber 12 does not continuously follow the same path, but all of the possible lines of travel define a locus of lines 36 that approximates an exponentially decaying surface of revolution in the region near the bobbin 16. Without some restraint, the oscillating movement of the optical fiber 12 as it traverses the locus of lines 36 can cause the optical fiber 12 to leave the groove 28 unintentionally, causing the end of the test.

In the past, it has been the practice to place a conical guide between the bobbin 16 and the drawing location 30, which guides the fiber 12 to the drawing location 30 and damps the oscillations. It has now been discovered that adhesive buildup on the inside of the conical guide causes a frictional drag that becomes larger as the amount of adhesive increases. Once the adhesive has accumulated a sufficient amount, which typically requires the passage of about 5 kilometers of optical fiber, the drag may become so large that the optical fiber breaks.

Figure 2:
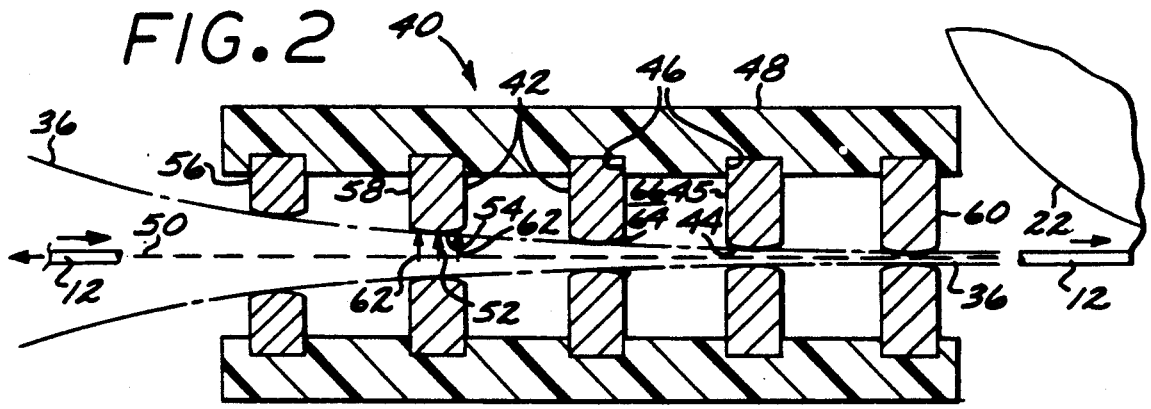
FIG. 2 is a enlarged side sectional view of a portion of the payout test system of FIG. 1, taken along line 2—2 and showing the arrangement of guide rings in the guide.

A guide 40 that overcomes this problem is illustrated generally in FIG. 1, and in more detail in FIG. 2. The guide 40 includes a plurality of guide rings 42, each having a cylindrically symmetric aperture 44 therein. Each guide ring 42 can be formed as an annulus, but in the embodiment of FIG. 2 each guide ring is illustrated as a plate 45. These plate-type guide rings 42 are supported in grooves 46 in a pair of side rails 48. The guide rings 42 are positioned by the side rails 48 so that a cylindrical axis 50 of each guide ring 42 a centered on a common axis. The guide 40 is preferably positioned in the apparatus 10 so that the axis 50 coincides with the cylindrical axis 18 of the bobbin 16.

The guide rings 42 are spaced apart in the manner depicted in FIG. 2. (In a preferred embodiment, about 15 guide rings are used and aligned in the manner illustrated, but only 5 are depicted in FIG. 2 for compactness of illustration.)

The dimension of each guide ring 42 may be described in terms of a minimum radius 52, which is the minimum distance of an inner surface 54 of the guide ring from the axis 50. The guide rings 42 do not have the same minimum radius. The guide rings 42 are arranged so that the minimum radius 52 of a first guide ring 56, nearest the bobbin 16, is the largest of the minimum radii of the several rings. The second guide ring 58, which is next to the first guide ring 56 and positioned further from the bobbin 16, has a smaller minimum radius 52 than the first guide ring 56. This progression of decreasing minimum radii with increasing distance from the bobbin 16 continues, with each succeeding guide ring having a smaller minimum radius 52 than the preceding guide ring. Alternatively stated, the size of the aperture 44 of each guide ring 42 increases with increasing distance from the wheel 22.

In operation, the optical fiber 12 passes through the apertures 44 of the guide rings 42 on its way from the bobbin 16 to the wheel 22. The gradually decreasing aperture size of the guide rings 42, with increasing distance from the bobbin 16, causes the locus 36 (or envelope of permitted lines of travel of the optical fiber 12) to be gradually reduce in diameter as the optical fiber 12 nears the wheel 22. Eventually, the aperture of a final guide ring 60, positioned nearest the wheel 22, is so small that the optical fiber 12 is guided to fall within the groove 28.

The minimum radii of the apertures 44 of the guide rings 42 are preferably selected to follow an exponential function that guides the optical fiber 12 to the proper position. Thus, the minimum radii are preferably fixed according to an equation $$\text{radius} = C_1 \exp(-x_i/C2)$$

where $x_i$ is the distance of the ith guide ring from the first guide ring, and C1 and C2 are constants. By way of illustration and not of limitation, in a preferred embodiment having 17 guide rings and a spacing between the guide rings of 1 inch, the individual rings were sized according to the equation $$\text{radius} = 0.5 \exp(-x/5)$$

where x is the distance in inches from the largest ring nearest the bobbin.

The guide 40 also functions to damp out transverse vibrations in the optical fiber 12. Because of the manner of the unwinding of the optical fiber 12 from the bobbin 16, the optical fiber 12 can transversely vibrate much like a plucked string. The gradually decreasing aperture minimum radii damp any such vibrations to nearly zero amplitude by the time any location on the optical fiber 12 reaches the final guide ring 60.

The profile of the inner surface 54 of each guide ring 42 is preferably in an concave inward arc, as illustrated for each of the guide rings 42 of FIG. 2. Stated otherwise, the minimum radius 52 of any particular guide ring 42 is less than a radius 62 displaced along the axis 50 at either extremum of the guide ring 42.

It has been found that the present guide 40 is effective in avoiding the buildup of adhesive that would cause drag on the optical fiber 12 as it passes from the bobbin to the wheel 22. The guide 40 is effective because it permits adhesive to escape from the guide and not build up in a manner that would increase the drag and cause the optical fiber 12 to break. Adhesive can be deposited from the optical fiber 12 onto the inner surface 54 of each guide ring 42. However, as illustrated at numeral 64, the adhesive accumulates on the curved inner surface 54 on the downstream portion of the inner surface 54, nearest the wheel 22. Any adhesive that would otherwise tend to be deposited near the minimum radius 52 or at any other location where adhesive buildup might create drag on the optical fiber 12 escapes and is carried to the location 64 indicated. With the adhesive buildup accumulated at this portion 64, it has been found that the adhesive is out of the way and does not cause a drag on the optical fiber 12. In drawing a very long optical fiber from the bobbin, large amounts of adhesive may be transferred from the optical fiber to the guide. However, the adhesive remains either as shown at numeral 64, or if the buildup is especially large, the excess adhesive is forced into the space between guide rings, as indicated at numeral 66.

Besides guiding the optical fiber 12 into the groove 28, damping out transverse vibrations in the optical fiber 12, and accumulating transferred adhesive in a manner that will not adversely affect the drawing of very long optical fiber lengths, the guide ring structure has other benefits in conducting optical fiber payout testing. Where an open sidewall structure is used, the open structure of the guide 40 permits direct visual observation of the optical fiber within the guide, which was not possible using a solid conical guide. The shape of the locus of fiber lines within the guide may be readily altered by slipping guide rings out of their slots and replacing them with other guide rings of different aperture sizes or other characteristics to be tested. The guide 40 may be cleaned of adhesive between tests far more easily than possible with a conical guide, simply by reaching a cleaning tool between the spaced apart guide rings 42, or even removing them from the side rails 48.

Figure 3:
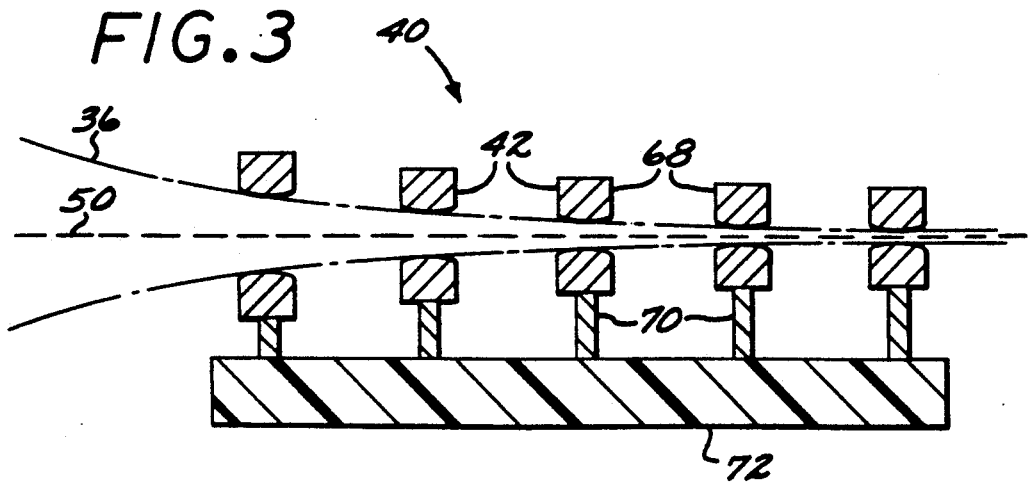
FIG. 3 is a view similar to that of FIG. 2, illustrating another embodiment of the guide.

Another embodiment of the invention is illustrated in FIG. 3. The approach is substantially the same, but each guide ring 42 is illustrated as being formed as a relatively thin annulus 68. Each guide ring 42 is mounted by a mounting rod 70 to a base 72. The guide rings 42 are mounted with a common central cylindrical axis, so that the mounting rods are of different lengths.

Another difference illustrated in FIG. 3 is that the inner diameters of the apertures 44 of the guide rings 42 can define a locus 36 other than an exponential curve of the type illustrated in FIG. 2. In FIG. 3, the locus is a conical surface. That is, the inner surfaces 54 lie on a straight line that angles outwardly from the cylindrical axis 50, with increasing distance from the wheel 22.

The present invention provides an important benefit in the high-speed payout testing of optical fibers from canisters. A long length of optical fiber can be paid out without a buildup of adhesive on the guide rings in such locations as would cause increasing drag on the optical fiber. Although particular embodiments of the invention have been described in detail for purposes of illustration, various modifications may be made without departing from the spirit and scope of the invention. Accordingly, the invention is not to be limited except as by the appended claims.

What is claimed is:

1. A guide for enclosing an optical fiber to progressively dampen vibrations in said optical fiber during canister payout, while simultaneously preventing excessive adhesive drag on said optical fiber, comprising:

a base including a pair of spaced-apart rails;

a plurality of axially spaced-apart guide rings coaxially disposed between said rails, said guide rings having interior openings progressively decreasing in size as distance from the optical fiber canister increases; and means on said guide rings for removing adhesive from said optical fiber and depositing said adhesive beyond contact with said optical fiber.

2. A guide according to claim 1, wherein each of said guide ring openings includes a minimum radius r determined by the formula $r = C_1 \exp(-X_i/C_2)$ where $X_i$ is the distance of the ith guide ring from an end of said guide facing said canister and $C_1$ and $C_2$ are constants.

3. A guide according to claim 1, wherein each of said guide ring openings includes a minimum radius, and said guide rings are disposed with their raddii forming a linear function throughout said guide.

4. A guide according to claim 1, wherein said means comprises a curved inner surface formed on each guide ring.

5. Test apparatus for testing the payout of an optical fiber from a canister, comprising:

a payout drive that draws the optical fiber from the canister; and a guide disposed between the canister and the payout drive, the guide having a plurality of spaced-apart guide rings with their centers lying along a common axis, the guide rings having inner diameters that increase with distance from the payout drive.

6. The test apparatus of claim 5, wherein the payout drive includes a cylindrical wheel having a circumferential notch therein.

7. The test apparatus of claim 5, wherein the guide further includes a base, and the guide rings are supported in the base.

8. The test apparatus of claim 5, wherein each guide ring is formed as an opening in a plate, and the guide further includes a pair of opposing side rails that support the plates.

9. The test apparatus 5, wherein the inner diameter of each guide ring varies with the position along the common axis, the radius at the axial center of the ring being smaller than the radius at either extremum of the ring.

10. A process for testing the payout of an adhesive-coated optical fiber from a canister, comprising the steps of:

mounting a canister having an optical fiber wound upon a generally cylindrical bobbin with a longitudinal axis of the bobbin coincident with a payout axis;

drawing the optical fiber off the bobbin, from a drawing location located along the payout axis; and guiding the optical fiber toward the drawing location at a plurality of guide locations between the canister and the drawing location, the step of guiding being conducted so that there is no buildup of adhesive at the guide locations to exert a drag force on the optical fiber.

11. The process of claim 10, wherein the step of guiding is accomplished by a guide disposed between the canister and the drawing location, the guide having a plurality of spaced-apart guide rings with their centers lying along a common axis, the guide rings having inner diameters that increase with distance from the payout drive.

12. The process of claim 11, wherein each guide ring has a rounded inner profile, when viewed in section.

13. The process of claim 11, wherein each guide ring is formed as an opening in a plate, and the guide further includes a pair of opposing side rails that support the plates.

* * * * *

UNITED STATES PATENT AND TRADEMARK OFFICE
CERTIFICATE OF CORRECTION

PATENT NO. : 5,029,959

DATED : July 9, 1991

INVENTOR(S) : Scott F. Stubbs

It is certified that error appears in the above-identified patent and that said Letters Patent is hereby corrected as shown below:

```
On the title page, in item [57]:
Abstract     line 2, "cylincrical" should read --cylindrical--
             line 3, "is is" should read --it is--
```

Signed and Sealed this

Second Day of February, 1993

Attest:

STEPHEN G. KUNIN

Attesting Officer

Acting Commissioner of Patents and Trademarks